United States Patent [19]

Levarek et al.

[11] Patent Number: 4,969,658
[45] Date of Patent: Nov. 13, 1990

[54] CHILD'S BICYCLE SEAT

[76] Inventors: Mathias Levarek, 66 Shore Road, Hampton Bays, N.Y. 11946; Andrew A. Kerr, P. O. Box 312, San Geronimo, Calif. 94963

[21] Appl. No.: 361,445
[22] Filed: Jun. 5, 1989
[51] Int. Cl.⁵ .............................................. B62J 1/16
[52] U.S. Cl. ..................................... 280/202; 297/243
[58] Field of Search ..................... 280/202, 288.4, 291; 297/195, 243; 403/4, 84, 97

[56] References Cited

U.S. PATENT DOCUMENTS

| 3,515,431 | 6/1970 | Grady | 297/250 |
| 3,738,704 | 6/1973 | Smith et al. | 297/195 |
| 3,743,321 | 7/1973 | Luschen et al. | 280/202 |
| 4,305,532 | 12/1981 | Reminger | 280/202 X |
| 4,632,453 | 12/1986 | Robbin et al. | 280/202 X |

FOREIGN PATENT DOCUMENTS 925512  2/1955  Fed. Rep. of Germany ...... 280/202

Primary Examiner—Charles A. Marmor
Assistant Examiner—Mitchell Bompey
Attorney, Agent, or Firm—Leon Gilden

[57] ABSTRACT

A child's bicycle seat is set forth wherein an elongate split post is securable to a horizontal support shaft of an associated bicycle with forward arcuate legs surrounding an associated forward steering post of the bicycle wherein the arcuate legs terminate in securement legs oriented generally parallel to one another to receive a threaded fastener therethrough. The cylindrical seat support shaft includes a rear downwardly depending plurality of tabs for securement of a further fastener with a medially positioned downwardly depending pair of flanges spaced between the rear tabs and the forward arcuate legs secured integrally and orthogonally downwardly from the seat support shaft with an aligned pair of hexagonal apertures therethrough to receive a hexagonally cross-sectional configured bolt. The hexagonal bolt is directed through one of a series of hexagonal apertures through foot brackets to enable the foot brackets to be rotated for height and orientation relative to the seat.

3 Claims, 1 Drawing Sheet

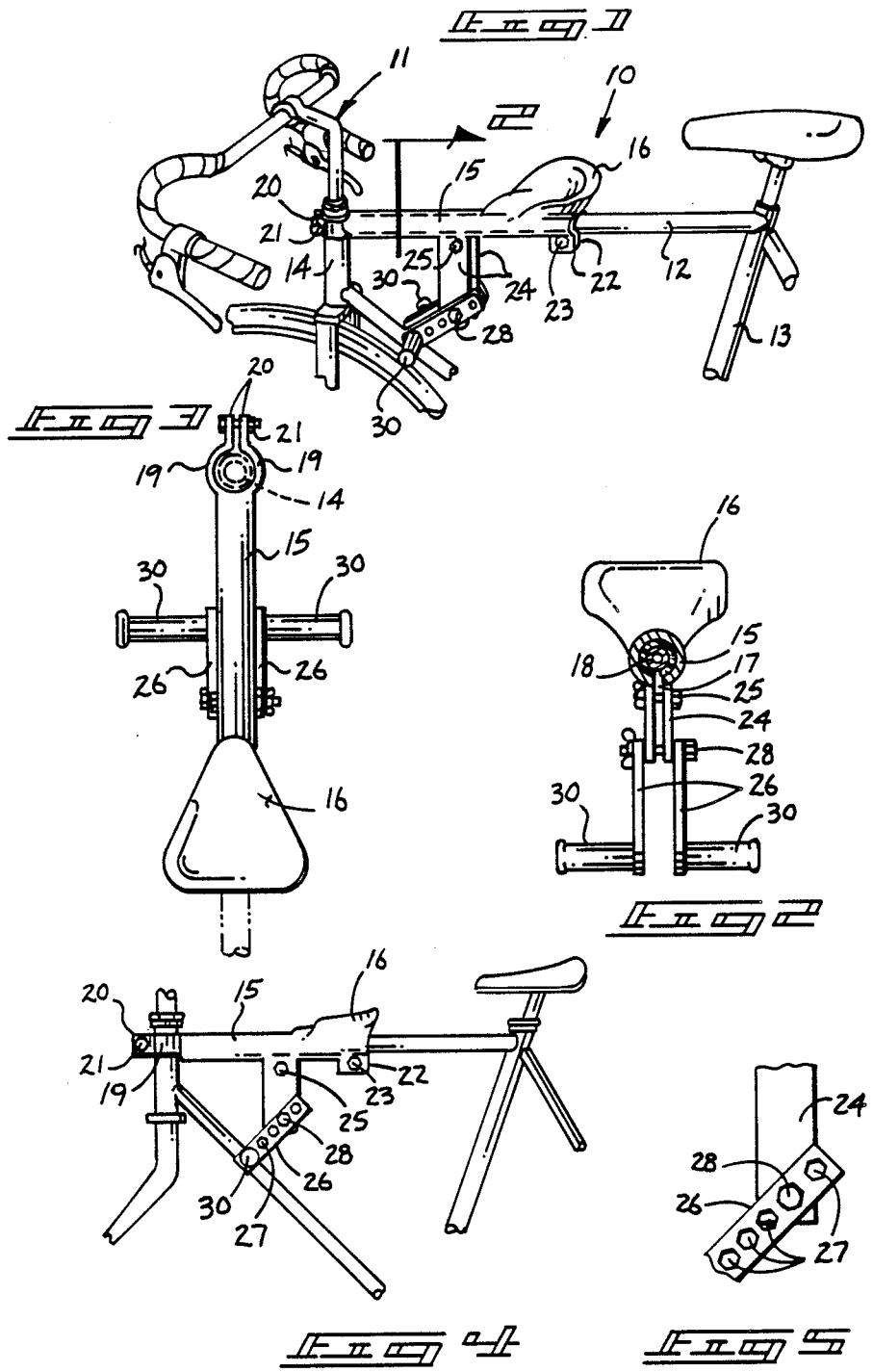

CHILD'S BICYCLE SEAT

BACKGROUND OF THE INVENTION

1. Field of the Invention

The field of invention relates to accessory seats, and more particularly pertains to a new and improved child's accessory seat that may be rigidly and fixedly secured to an associated bicycle to enhance and maintain balance of the bicycle during use.

2. Description of the Prior Art

The use of various accessory seats for vehicles is well known in the prior art. Heretofore the bicycle seats have been oriented to attempt to utilize an existing framework of an associated vehicle to accommodate an accessory seat. In the case of bicycles, the positioning of the seat becomes critical to effect balance in the positioning of an additional rider, such as a child, thereon. For example, Smith, et al., U.S. Pat. No. 3,738,704 sets forth the use of an accessory bicycle seat that is secured to the horizontal support shaft of an associated bicycle, but is directed for positioning adjacent the forward steering post of the bicycle, as opposed to the instant invention which orients the seat adjacent the rider.

Grady U.S. Pat. No. 3,515,431 sets forth a vehicular accessory seat wherein a seat provided with a generally "L" shaped framework is secured to a floor of a motor vehicle to orient the seat in an overlying orientation relative to the vehicular seat.

Luschen, et al., U.S. Pat. No. 3,743,321 sets forth an accessory bicycle seat with suitable bracketry attached to the neck portion of an associated bicycle about the steering post to accommodate a child thereon.

Reminger U.S. Pat. No. 4,305,532 sets forth a bicycle load support provided with a horizontal support base that is securable to a horizontal beam secured to an associated horizontal support post of the bicycle.

Robbin U.S. Pat. No. 4,632,453 sets forth an auxiliary bicycle seat wherein a tubular support is mounted to an associated bicycle's horizontal tubular section with separate leg support means mounted to the generally vertical steering post of the bicycle.

As such, it may be appreciated that there is a continuing need for a new and improved child's bicycle seat which addresses both the problems of ease of use and effectiveness in placement adjacent a rider of a bicycle to maintain balance and convenience in use of the accessory seat and in this respect, the present invention substantially fulfills this need.

SUMMARY OF THE INVENTION

In view of the foregoing disadvantages inherent in the known types of accessory bicycle seats now present in the prior art, the present invention provides a child's bicycle seat wherein the same may be conveniently and rigidly secured to an associated bicycle horizontal support shaft to maintain alignment and balance during accommodation of an additional rider to a bicycle. As such, the general purpose of the present invention, which will be described subsequently in greater detail, is to provide a new and improved child's bicycle seat which has all the advantages of the prior art accessory vehicular seats and none of the disadvantages.

To attain this, the present invention comprises a split cylindrical seat support shaft provided with a slot formed coaxially and through a bottom surface of a wall of the support shaft with a forward pair of arcuate legs terminating in parallel securement legs for securement about the bicycle's steering post. The other terminal end of the seat support shaft includes a plurality of spaced downwardly depending tabs for reception of a fastener therethrough. Positioned somewhat medially of the forward and rear ends of the support shaft are a plurality of parallel orthogonally oriented flanges that receive a further fastener adjacent the seat support shaft. Adjacent lower terminal ends of each flange are a plurality of aligned hexagonal apertures to receive a hexagonal shank bolt therethrough that in turn secures a plurality of foot brackets, each formed with an aligned series of hexagonal apertures to thereby enable rotation and positioning of the brackets relative to the flanges. Each lowermost terminal end of each bracket includes a foot peg thereon which may be pivotally mounted to accommodate repositioning of the foot pegs when not in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's bicycle seat which has all the advantages of the prior art accessory seats and none of the disadvantages.

It is another object of the present invention to provide a new and improved child's bicycle seat which may be easily and efficiently manufactured and marketed.

It is a further object of the present invention to provide a new and improved child's bicycle seat which is of a durable and reliable construction.

An even further object of the present invention is to provide a new and improved child's bicycle seat which is susceptible of a low cost of manufacture with regard to both materials and labor, and which accordingly is then susceptible of low prices of sale to the consuming public, thereby making such child bicycle seats economically available to the buying public.

Still yet another object of the present invention is to provide a new and improved child's bicycle seat which provides in the apparatuses and methods of the prior art some of the advantages thereof, while simultaneously overcoming some of the disadvantages normally associated therewith.

Still another object of the present invention is to provide a new and improved child's bicycle seat arranged to maintain balance and provide geometric integrity to the child's bicycle seat when secured to an associated bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention secured to an associated bicycle.

FIG. 2 is an orthographic view taken along the section line 2 of FIG. 1 in the direction indicated by the arrows.

FIG. 3 is a top orthographic view of the instant invention secured to the associated bicycle.

FIG. 4 is an orthographic view taken in elevation of the instant invention secured to the associated bicycle.

FIG. 5 is an orthographic view of the downwardly depending flanges and foot brackets of the instant invention.

DESCRIPTION OF THE PREFERRED EMBODIMENT

With reference now to the drawings, and in particular to FIGS. 1 to 5 thereof, a new and improved child's bicycle seat embodying the principles and concepts of the present invention and generally designated by the reference numeral 10 will be described.

More specifically, it will be noted that the child's bicycle seat apparatus 10 essentially comprises securement to an associated bicycle 11 having a horizontal support shaft rigidly secured to a rear seat post 13 with an associated seat vertically mountable therein with the horizontal support shaft 12 secured integrally at its forwardmost end to a steering post 14. The invention includes a split cylindrical seat support shaft 15 having integrally secured and projecting upwardly from its exterior surface adjacent a rear end thereof a seat 16 that may be padded or formed of a resilient polymeric-type material to accomodate a child comfortably thereon. The seat support shaft 15 includes an elongate slot 17 coaxially formed throughout an outer wall of the seat support shaft 15 through a surface opposed to that of the seat 16. Formed interiorly of the seat support shaft 15 is a split resilient cushioning sleeve 18 formed of a relatively dense polymeric material to accommodate impact and enhance comfort of a child secured within the seat 16. The forwardmost terminal ends of the seat support shaft 15 are formed with coextensively formed arcuate legs 19, as illustrated in FIG. 3 for example, positioned and coextensive with side surfaces of the seat support shaft 15 to receive the steering post 14 therewithin. The arcuate legs 19 terminate at their forward-most ends with parallel securement legs 20 formed with an aligned through-extending aperture therethrough to receive a first fastener 21 to secure the arcuate legs and the seat support shaft relative to the steering post 14. Projecting downwardly and formed to either side of the slot 17 are rear tabs 22 formed orthogonally downwardly relative to the seat support shaft 15 with through-extending apertures formed therethrough to receive a second fastener 23. In this manner, the seat support shaft 15 is fixedly secured forwardly and rearwardly relative to the bicycle frame. Positioned medially of the seat support shaft 15 are a plurality of spaced flanges 24 oriented generally parallel to the rear tabs 22 on either side of the slot 17 and formed with a first pair of aligned apertures (not shown) to receive a third fastener 25 to further enhance securement of the seat support shaft 15 to the bicycle frame. The flanges 24 extend downwardly and, as illustrated in FIG. 5, are formed with a pair of aligned through-extending hexagonal apertures 27a to receive a hexagonal fourth fastener 28 formed with a hexagonal shank. The fourth fastener 28 secures a plurality of foot brackets 26 to exterior surfaces of the spaced flanges 24 wherein the foot brackets 26 are formed with hexagonal foot bracket openings 27 aligned along each foot bracket 26. In this manner, the fourth fastener 28 locks each foot bracket 26 to each spaced flange 24 and enables a relative rotative positioning of each foot bracket 26 to vertically and horizontally orient the foot pegs 30 secured to lowermost terminal ends of each foot bracket 26 relative to the spaced flanges 24 to accommodate various lengths of a child's leg when the child is seated within the seat 16, as well as enabling accommodation of various frame sizes of bicycles to prevent interference of the foot brackets 26 with portions of a bicycle framework.

In this manner, a child may enjoy the same ride height as the rider of the bicycle and further provide greater control of the bicycle with the child oriented generally adjacent the bicycle's main seat to enhance control and stability of the bicycle during use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An auxiliary bicycle seat apparatus for securement to a bicycle wherein the bicycle includes an elongate horizontal support shaft with a bicycle seat post integrally secured at its rear terminal end, and a steering post integrally secured at the horizontal support shaft's forward end, the apparatus comprising, an elongate seat support shaft including a slot formed coextensively and coaxially parallel through an exterior wall of the seat support shaft, wherein the slot defines opposing side edges in the exterior wall of the seat support shaft, and including a seat integrally formed adjacent a rear end of the seat support shaft diametrically opposed to the slot, shaft diametrically opposed to the slot, and clamping means for securement of the seat support shaft in surrounding relationship to the horizontal support shaft of the bicycle between the steering post and the seat post, and a plurality of spaced parallel flanges integrally and orthogonally formed to the seat support shaft onto the opposing side edges of the slot, and a foot peg bracket adjustably mounted to each external surface of each flange, and a foot peg mounted to each terminal end of each foot peg bracket, and wherein the elongate seat support is cylindrical and includes a resilient cushioning sleeve laminated to an interior surface of the seat support, and wherein the clamping means includes a first clamping portion including spaced arcuate legs integrally secured to a forward end of the seat support and coaxial with the steering post, and each arcuate leg includes a securement leg extending orthogonally of each arcuate leg and coextensive with the seat support, and each securement leg includes an aligned through-extending aperture to receive a first fastener therethrough to secure the arcuate legs about the steering post, and wherein the clamping means further includes a plurality of rear tabs integrally and orthogonally secured to either side of the slot adjacent a rear end of the seat support and includes further trough-extending aperture to receive a second fastener therethrough to clamp the seat support at its rear terminal end, and wherein each of the flanges includes a yet further through-extending aperture aligned with one another therethrough for receiving a third fastener therethrough wherein the third fastener is oriented adjacent the seat support, and wherein each of the flanges includes a hexagonal opening, wherein each hexagonal opening is aligned with one another and is oriented adjacent a lowermost end of each flange, and each hexagonal opening is configured to receive a fourth fastener formed with a hexagonal shank of complementary configuration to each hexagonal opening.

2. An auxiliary bicycle seat apparatus as set forth in claim 1 wherein each foot peg bracket includes a series of foot peg bracket openings, each of a hexagonal configuration substantially equal to that of the hexagonal openings of the flanges to secure each foot peg bracket in a relative rotational rotation relative to each flange.

3. An auxiliary bicycle seat apparatus as set forth in claim 2 wherein the flanges are positioned medially of the forward and rear terminal ends of the elongate seat support and wherein the flanges and the tabs are parallel and aligned relative to one another.

* * * * *